US010830368B2

(12) United States Patent
Bruczuk et al.

(10) Patent No.: US 10,830,368 B2
(45) Date of Patent: Nov. 10, 2020

(54) PNEUMATIC MULTI-VALVE DEVICE AND PRODUCTION METHOD

(71) Applicant: ETO Magnetic GmbH, Stockach (DE)

(72) Inventors: Witold Bruczuk, Wroclaw (PL);
Mariusz Bunio, Zerniki Male (PL);
Michael Zinser, Orsingen-Nenzingen (DE)

(73) Assignee: ETO Magnetic GmbH, Stockach (DE)

( * ) Notice: Subject to any disclaimer, the term of this patent is extended or adjusted under 35 U.S.C. 154(b) by 128 days.

(21) Appl. No.: 16/094,240

(22) PCT Filed: Feb. 3, 2017

(86) PCT No.: PCT/EP2017/052379
§ 371 (c)(1),
(2) Date: Oct. 17, 2018

(87) PCT Pub. No.: WO2017/182149
PCT Pub. Date: Oct. 26, 2017

(65) Prior Publication Data
US 2019/0120398 A1    Apr. 25, 2019

(30) Foreign Application Priority Data

Apr. 18, 2016  (DE) .................. 10 2016 107 160

(51) Int. Cl.
*F16K 27/02*  (2006.01)
*F16K 27/00*  (2006.01)

(52) U.S. Cl.
CPC .......... *F16K 27/029* (2013.01); *F16K 27/003* (2013.01)

(58) Field of Classification Search
CPC .............. F15B 13/0835; F15B 13/0871; F16K 27/003; F16K 27/029; F16K 27/10;
(Continued)

(56) References Cited

U.S. PATENT DOCUMENTS 4,341,241 A * 7/1982 Baker ................. F16K 37/0041
137/554
4,578,662 A * 3/1986 Slavin ................. F16K 31/0631
137/625.65
(Continued)

FOREIGN PATENT DOCUMENTS

CN         101156011 A     4/2008
CN         203202358 A     9/2013
(Continued)

OTHER PUBLICATIONS

International search report for patent application No. PCT/EP2017/052379 dated May 24, 2017.

*Primary Examiner* — Seth W. MacKay-Smith
(74) *Attorney, Agent, or Firm* — Bachman and Lapointe PC; George Coury

(57) ABSTRACT

A pneumatic multi-valve device includes a housing (18) having a housing main body (13) with a plurality of electromagnetic valve actuators (1), each having coil elements (2) arranged stationary in the housing (18), a core (4) arranged in the housing (18), and armature elements (15) displaceable along a displacement axis (V) in the housing (18) in relation to a pneumatic connection (12) of the housing (18). Displacement axes (V) of the armature elements (15) are oriented parallel and the pneumatic connections (12) are arranged adjacent to each other. The cores (4) each have a venting bore (5) connected to a venting collection channel (31). The venting collection channel (31) is on the side of the cores (4) facing away from the connection housing side (14), and is bounded on the housing back side (16) by a housing cover (17) fastened to the housing main body (13). The venting collection channel is connected to a venting opening of the housing (18), which venting opening is arranged on a housing side different from the housing back side (16), in particular on the connection housing side (14)

(Continued)

having the pneumatic connections (12). The housing cover (17) is fixed to the housing base body (13) via an air-tight welded connection (35), in particular an ultrasonic or laser welded connection.

18 Claims, 5 Drawing Sheets

(58) Field of Classification Search
CPC .... F16K 27/102; F16K 27/12; F16K 31/0606; F16K 31/0651; F16K 31/0675
USPC ............................ 137/883, 884; 251/129.21
See application file for complete search history.

(56) References Cited

U.S. PATENT DOCUMENTS

| | | | | |
|---|---|---|---|---|
| 4,674,536 A * | 6/1987 | Warrick | ................ | B60T 8/3635 |
| | | | | 137/614.19 |
| 4,678,006 A * | 7/1987 | Northman | ........... | F16H 61/0009 |
| | | | | 137/596.17 |
| 4,768,559 A * | 9/1988 | Hehl | .................. | G05D 23/1919 |
| | | | | 137/887 |
| 4,998,559 A * | 3/1991 | McAuliffe, Jr. | .... | F16H 61/0251 |
| | | | | 137/596.17 |
| 5,127,434 A * | 7/1992 | Kline | ................ | B60H 1/00642 |
| | | | | 137/596.17 |
| 5,301,717 A * | 4/1994 | Goedecke | ........... | F15B 13/0839 |
| | | | | 137/269 |
| 5,322,260 A * | 6/1994 | Forbes | ................ | F16K 31/0651 |
| | | | | 251/129.14 |
| 5,361,802 A * | 11/1994 | Kroll | ...................... | F16K 11/24 |
| | | | | 137/552 |
| 6,079,642 A * | 6/2000 | Maier | ................ | F02M 51/0667 |
| | | | | 239/585.1 |
| 8,397,763 B2 * | 3/2013 | deGreef | ............. | A61G 7/05776 |
| | | | | 137/883 |
| 8,434,520 B2 * | 5/2013 | Frank | ...................... | B60T 8/327 |
| | | | | 137/315.03 |
| 9,010,365 B2 * | 4/2015 | Cella | ...................... | B60T 11/26 |
| | | | | 137/545 |
| 9,679,690 B2 * | 6/2017 | Nila | ........................ | H01F 7/127 |
| 2007/0273462 A1 * | 11/2007 | Stehle | ...................... | H01F 7/08 |
| | | | | 335/14 |
| 2009/0114865 A1 | 5/2009 | Homann et al. | | |
| 2010/0038571 A1 | 2/2010 | Dieter et al. | | |
| 2011/0297248 A1 * | 12/2011 | Nelson | .................. | F16K 27/044 |
| | | | | 137/343 |
| 2016/0214210 A1 * | 7/2016 | Harck | .................. | B23K 26/0643 |
| 2017/0284285 A1 * | 10/2017 | Lenk | ................ | F02M 35/10255 |

FOREIGN PATENT DOCUMENTS

| | | |
|---|---|---|
| DE | 1196917 B | 7/1965 |
| DE | 10224732 A1 | 10/2003 |
| DE | 10311239 B3 | 11/2004 |
| DE | 102013113673 A1 | 6/2015 |
| DE | 102014103246 B3 | 6/2015 |
| EP | 1486709 A1 | 12/2004 |

\* cited by examiner

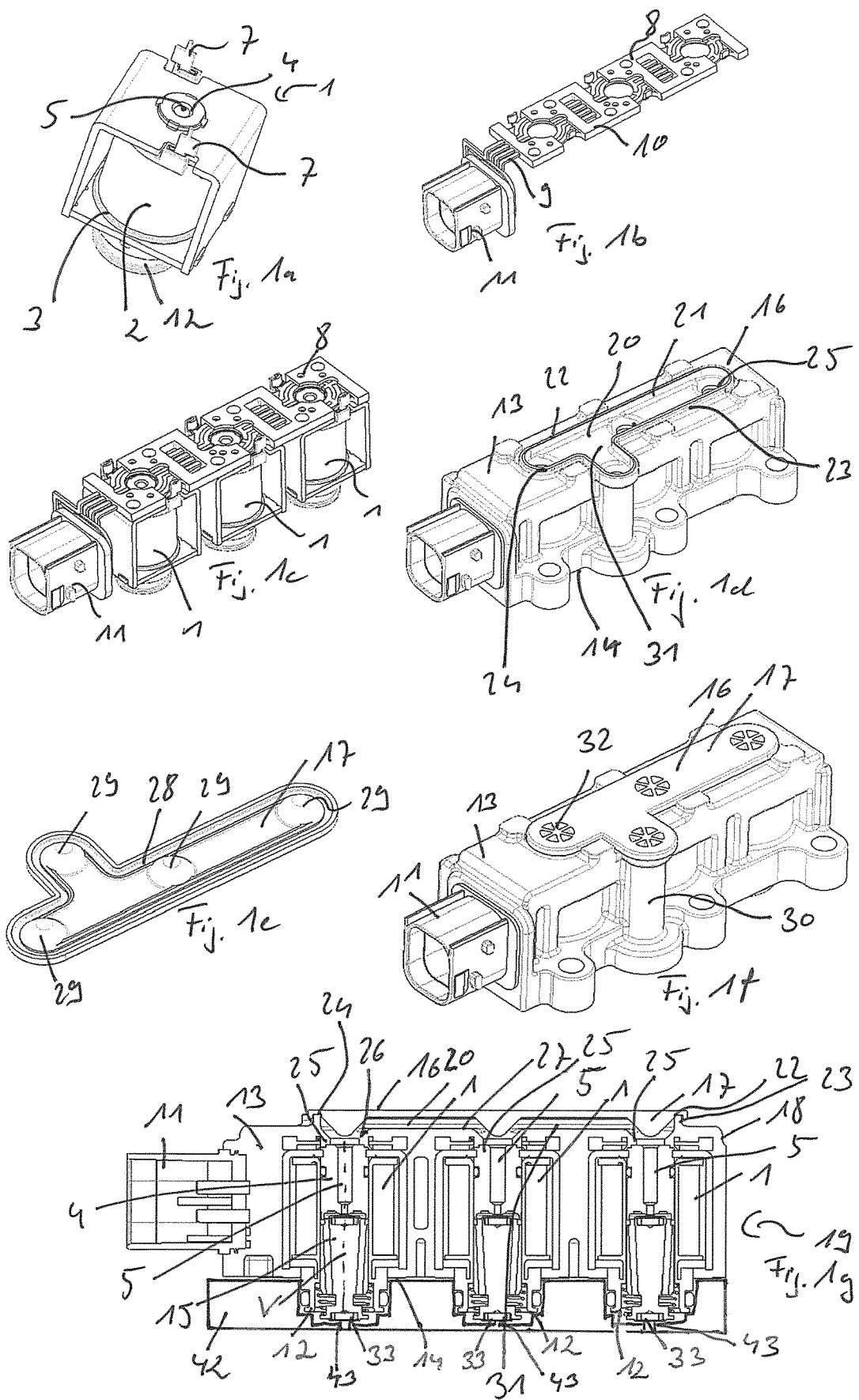

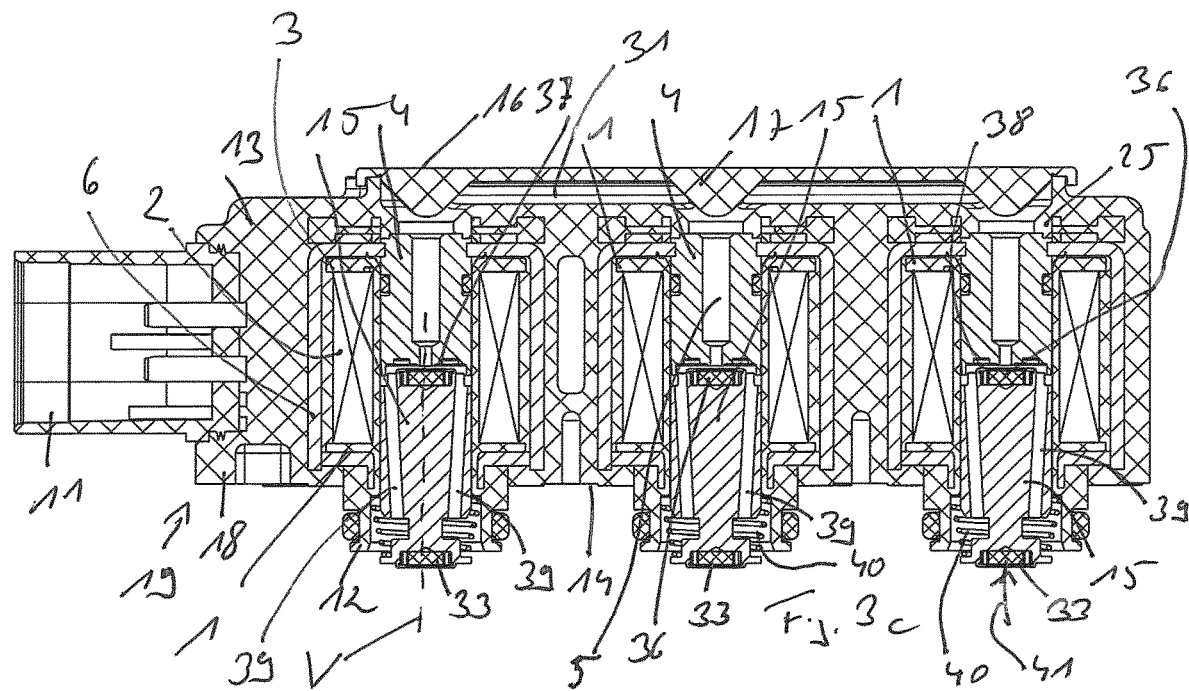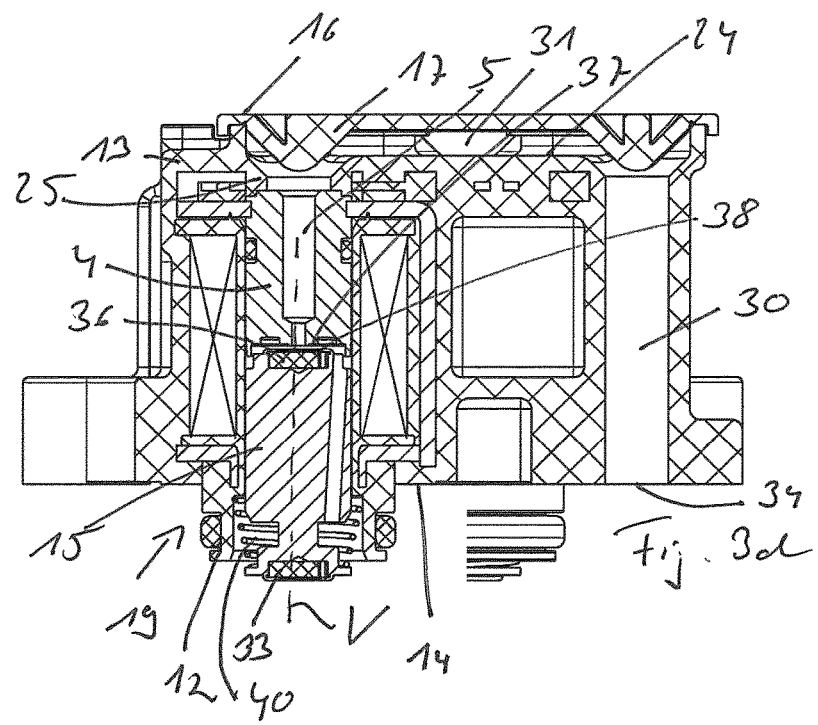

PNEUMATIC MULTI-VALVE DEVICE AND PRODUCTION METHOD

BACKGROUND OF THE INVENTION

The invention relates to a pneumatic multi-valve device (valve block), in particular for use in electronically regulated air spring systems of vehicles, preferably utility vehicles, comprising a housing, which has a housing main body with a plurality of electromagnetic valve actuators, each having coil elements arranged in the housing in a stationary manner, a core arranged in the housing, and armature elements, which can be displaced along a displacement axis in the housing in relation to the core and in relation to a (respective) pneumatic connection of the housing in response to energization of the coil elements, wherein the displacement axes of the (plurality of) armature elements of the valve actuators are oriented parallel and the pneumatic connections associated with the armature elements are arranged adjacent to each other on a connection housing side, which is spaced apart from a housing back side facing away therefrom along the displacement axes, wherein the cores each have a venting bore, which is connected, for air conduction, to a venting collection channel on the side of the cores facing away from the connection housing side, which venting collection channel is bounded on the housing back side by a housing cover fastened to the housing main body, which venting collection channel is connected, for air conduction, to a venting opening of the housing, in particular in the housing base body, which venting opening is arranged on a housing side different from the housing back side, in particular on the connection housing side having the pneumatic connections.

The invention further relates to a method for producing such a multi-valve arrangement.

Known multi-valve devices (valve blocks) are used in the context of electronically regulated air spring systems for utility vehicles. In the case of the known multi-valve devices, the armature elements of the different valve actuators interact with a respective valve seat arranged outside of the housing in a distributor plate connected to the housing, in order to open and to close the connection from a compressed air line to a working line in the context of the air spring application. The individual valves or valve actuators, respectively, are vented via venting bores, which are provided in the armature elements and which, on a pneumatic connection side (connection housing side) of the housing back side facing away from the housing, which is connected to the distributor plate, lead into a collection area or collection channel, respectively, which is bounded by a cover, which is screwed to a housing body of the housing and which has a trough-shaped curvature to form the collection channel. An elastomeric ring seal is arranged between cover and housing in order to establish a connection, which is air-tight against the atmosphere.

The venting air flows from the collection channel to a venting opening on the connection housing side via a housing-side venting channel parallel to the displacement axes of the actuator elements. The guiding of the armature elements takes place in armature guide tubes, which are accommodated in the coil carrier of the coil elements of the valve actuators.

The extensive manufacturing process is perceived to be disadvantageous in the case of the known valve devices. This has several reasons. In particular the extensive, air-tight cover fixation via a plurality of screwing processes and the necessity of providing an elastomeric ring seal is disadvantageous. It is furthermore perceived to be disadvantageous that the housing cover has to be molded in a trough-like manner, in order to connect the venting bores to each other for air conduction or in order to form the venting collection channel, respectively. This is so, because in the case of the known solution, connection channels, which are axially aligned with the venting bores and which are embodied in the housing base body, protrude beyond a contact or base surface, respectively, for attaching the housing cover. It is a further disadvantage of known multi-valve devices that the housing has to be produced in a two-part overmolding process. The reason for this is that the coil carriers, together with the wire mesh arrangement for electrically contacting the coil elements, are initially overmolded and the unit of various coil elements produced in this way is accommodated in a joint carrier yoke, which clasps the various coil elements, whereupon the carrier yoke and already overmolded coil elements or the coil element unit, respectively, are or is overmolded again, respectively. The housing produced in this way is then screwed on the back side to the cover in order to form the venting collection channel or chamber, respectively, and is connected to the distributor plate on the pneumatic connection side. In addition, the required amount of copper for forming the coil elements is relatively high.

SUMMARY OF THE INVENTION

Based on the above-mentioned prior art, the invention is based on the object of specifying a pneumatic multi-valve device, which can be produced easily and which can preferably manage with a smaller number of components. The used amount of copper for forming the coil elements (with equal or higher displacement force of the armature elements) is to preferably be reduced as well. The object is further to specify a simplified production method for a multi-valve device according to the invention.

With regard to the pneumatic multi-valve device, this object is solved by means of the features disclosed herein, i.e. in the case of a generic multi-valve device, in that the housing cover is fixed to the housing base body via an air-tight welded connection, in particular an ultrasonic or laser welded connection.

With regard to the method, the object is solved by means of the features disclosed herein, i.e. in the case of a generic method, in that the housing cover is welded to the, preferably monolithic, housing base body by establishing an air-tight welded connection, in particular an ultrasonic or laser welded connection, preferably without interpostioning an elastomeric seal.

Advantageous further developments of the invention are specified in the subclaims. All combinations of at least two features disclosed in the description, the claims and/or the Figures, fall within the scope of the invention. To avoid repetitions, features disclosed according to the device shall also apply as being disclosed according to the method and as being capable of being claimed. Features disclosed according to the method shall likewise also apply as being disclosed according to the device and as being capable of being claimed.

The invention is based on the idea of not connecting the housing cover, which bounds the venting collection channel on the housing back side, to the housing base body by means of screwing and interpositioning an elastomeric seal, as before, but by means of welding, i.e. establishing a welded connection, but which does not only ensure the fixing function, but additionally also the sealing function of the venting collection channel against the atmosphere. The welding of the cover thus takes place such that no air-permeable gap remains between cover and housing base body. In other words, the housing cover is connected to the housing base body in an air-tight manner by means of welding, in particular ultrasonic or laser welding, wherein the welded connection is preferably embodied in a circumferential manner, i.e. as welding ring connection, for this purpose, so as to thus provide for an air-tight connection of housing cover and housing base body. An embodiment is thereby preferred, in the case of which an elastomeric ring seal provided between housing cover and housing base body for ensuring a tight connection (sealing of the venting channel against the atmosphere) is forgone. The component number is reduced in particular when the elastomeric seal is forgone. The realization of an air-tight welded connection is furthermore mastered in terms of manufacturing or is surprisingly simple, respectively, so that additional mechanical connections, such as screw connections and the fixing steps necessary for this purpose can be forgone. Compared to the prior art solution, the housing cover can further have a smaller surface extension, because the contact or bearing surface, respectively, on the housing base body can be significantly smaller as a result of the realization of a welded connection instead of a screw connection.

In a further development of the invention, it is advantageously provided that the venting collection channel has a trough, which is formed in the housing base body, in particular as a result of a corresponding tool embodiment of the corresponding production injection molding tool, the trough opening of which, which faces in the direction of the housing back side, is closed by the housing cover. Connection channels, which are formed by the housing base body and which are connected to the venting bores of the cores for air conduction and which are preferably axially aligned therewith, lead into the trough, in particular on or in a trough base, respectively, namely in each case offset at a distance from the trough edge in the direction of the connection housing side. A venting channel, which leads to the venting opening and preferably either forms the latter and is preferably formed by the base housing body, additionally leads into the trough, in particular on or in a trough base, respectively, wherein the venting channel is also offset at a distance to the trough edge in the direction of the connection housing side. To put it in yet another way, the outlet openings of the connection channels and the inlet opening of the venting channel are located along a vertical below the trough opening or the trough edge, respectively, namely at a distance offset thereto in the case of an imaginary setup of the housing on the housing connection side. It is thus important that the openings of the connection channels and the opening of the at least one, preferably only one venting channel, are recessed in the direction of the connection housing side, based on a trough edge, which points in the direction of the housing back side, so that the connection for air conduction between the connection channels and thus the venting bores among each other as well as to the venting channel, does not first need to be created by means of a correspondingly curved embodiment of the housing cover, thus by means of the housing cover, as in the case of the prior art, but that the air-conducting connection is ensured by means of a housing base body side indent or trough itself, respectively. This embodiment then makes it possible to embody the housing cover to be comparatively flat—it is in particular possible to avoid curvatures in a direction, which faces away from the housing connection side—as a whole, a design of the multi-valve device with a smaller volume can be created thereby, which is advantageous in the case of the small installation space in the motor vehicle application.

It turned out to be particularly advantageous that the trough opening is bounded by a circumferential ring collar, which forms the trough edge and which is embodied monolithically (in one piece) with the housing base body, in particular in the plastic injection molding process, on which ring collar said housing cover sits on the front side, i.e. on the back side of the housing base body facing away from the connection housing side. The housing cover can thereby be welded directly to the ring collar and/or to a housing base body section adjacent to the ring collar, wherein it is preferred with respect to an installation space volume reduction, to weld the housing cover to the ring collar, preferably only to the latter.

In order to create a positive connection, which is effective in the direction of the surface extension of the housing cover and which is advantageous in particular for an, in particular automated positioning process or step, respectively, prior to the welding process, in addition to the welded connection, it is provided in a further development of the invention that the housing cover engages across the ring collar on the outer circumferential side thereof in the direction of the connection housing side. In addition or in the alternative, the housing cover can protrude into the trough in the direction of the connection housing side on the inside of the ring collar. It is particularly preferred, when, on the inside, i.e. on the side facing the housing base body, the housing cover has a ring groove, in which the ring collar can be accommodated on the front side.

It is particularly advantageous when, in the direction of the venting channels, the housing cover has protuberances, which preferably protrude into the connection channels and which preferably comprise reinforcing ribs on the housing back side of the housing cover. On the one hand, a component distortion can be avoided hereby. The stability of the housing cover is furthermore increased. It is particularly advantageous, when the housing cover does not have any elevations or protuberances on the housing back side facing away from the housing base body, but forms a flat or plane surface, respectively.

It is particularly preferred, when the housing or the housing base body, respectively, requires a single overmolding process for the production thereof. The housing preferably comprises a single monolithic housing base body (in addition to the housing cover), which includes the other components or functional units, respectively, of the multi-valve device. This means that the coil elements are not combined by means of an temporally preceding overmolding step to form a coil unit, which is then overmolded again after arranging a yoke—it is in fact preferred, if the coil elements, together with a respective yoke, are overmolded directly by the housing base body or if the housing base body is created by overmolding the coil units together with the yoke, respectively, to which the housing cover is then fixed in an air-tight manner by means of welding in the manner according to the invention.

It is particularly advantageous when the pneumatic connections of the housing are held in the above-mentioned monolithic housing body by means of overmolding.

With regard to a simplified assembly, it is preferred when the connection channels, which extend the venting bores in the cores in the direction of the housing base body trough or connect them to the venting collection channel, respectively, permeate a joint electrical connection plate for electrically contacting the plurality of said coil elements, preferably axially in extension of the displacement axes. In other words, the housing base body preferably extends axially through the connection plate with a section, which forms the connection channels. Such a connection plate is preferably located on the side of the coil elements facing away from the connection housing side, wherein it is particularly preferred when the connection plate will be or is attached, respectively, to magnetically conducting yoke elements of the individual coil elements.

To save copper for the coil elements, it is preferred when armature guide tubes for guiding the armature elements in response to their displacement movement along the respective displacement axis are forgone and the armature elements are guided directly in a centrical passage opening of a respective coil carrier, in particular a plastic injection molded part. The distance of the armature elements to the coil elements is reduced thereby and a material transition is also saved.

The venting bores in the core are preferably embodied as axial passage channels, which run in a straight line in extension of the displacement axes. Each core preferably comprises a centrical venting bore, which runs axially in a straight line and which is aligned with the displacement axis.

It turned out to be particularly advantageous that, with the respective associated core, the armature elements bound a working chamber, which can be vented via the associated venting bore and preferably the housing body-side connection channel in the venting collection channel, which is bounded by the housing cover.

The coil carriers are preferably each embodied in one piece with a pneumatic connection, which permeates the housing, in particular the monolithic housing body on the connection housing side. To connect the pneumatic connection area to the associated venting bore in the core, it is preferred when a connection line is provided, which is associated with the respective armature elements and which connects the pneumatic connection, in particular a working line, to the associated venting bore for air conduction, in particular via a working chamber, which is embodied between the armature elements and the core. The above-mentioned connection line is preferably realized as bores embodied inside the armature elements. In addition or in the alternative, a connection channel can be realized on the outer circumference of the armature elements, which is preferably bounded directly by the coil carrier radially on the outside.

It turned out to be particularly advantageous to associate a venting valve seat, which is associated with the associated venting bore, with the armature elements for closing the respective venting bore, preferably by energizing the coil elements. The armature elements preferably interact with a front side sealing element held in said armature elements, in particular an elastomeric element with the core-side venting valve seat. Regardless of the concrete embodiment of the pairing armature elements/venting valve seat, it is preferred when the armature elements can be displaced against the spring force of a return spring when energizing the coil element, wherein it is particularly preferred when the spring elements apply a spring force to the armature elements away from the venting valve seat, so that the working area, which is preferably bounded by the armature elements and the core is preferably connected to the connection area via a an armature-side connection line for air conduction and is vented in response to non-energization.

The armature elements preferably interact directly with a working valve seat, in particular via sealing elements, which are fixed thereto, more preferably which are elastomeric, which is more preferably arranged on a side facing away from the respective connection valve seat, i.e. in the area of the connection housing side. More preferably, the working valve seats are not arranged in the monolithic plastic housing body, but inside a distributor plate, which is connected to the housing via the pneumatic connections. Preferably at least one pressure supply line, in particular a joint pressure supply line for all valve actuators, runs in the distributor plate, wherein the valve actuators open or close an opening between the at least one pressure supply line and an, in particular respective working line, by direct or indirect interaction of the armature elements with the working valve seat. An above-mentioned, preferably provided return spring is preferably arranged in such a way that this connection is or remains automatically closed in the case of non-energization of the coil elements.

The invention also leads to a method for producing a multi-valve arrangement, which is embodied according to the concept of the invention. As part of the method, a plurality of coil elements each comprising a core arranged therein is provided, wherein each core has a venting bore. According to the invention, a housing base body is produced, preferably by means of a joint overmolding of the coil elements, more preferably together with the yokes surrounding the coil elements, wherein a housing cover is fixed to the base body in an air-tight manner by means of welding. The housing cover thereby preferably closes a trough molded in response to the production of the housing base body in the plastic injection molding process, into which trough the venting bores lead via connection channels formed in the housing base body, namely at a distance along the imaginarily extended displacement axes of the armature elements to a trough opening edge, which is more preferably formed by a protruding ring collar, which is embodied in one piece with the housing base body. To produce the housing base body, a single overmolding process is preferably used, in response to which the individual coil elements are accommodated for the first time in a joint housing body, namely the housing base body. It is particularly preferred when the coil elements are contacted by a joint connection plate prior to this overmolding process, which connection plate is also overmolded and which leads to an, in particular lateral, connection, in particular a bushing or a plug, which is or will also be held, respectively, in the housing base body by means of partial overmolding.

BRIEF DESCRIPTION OF THE DRAWINGS

Further advantages, features and details of the invention follow from the following description of preferred exemplary embodiments as well as by means of the Figures.

FIGS. 1a to 1g: show different manufacturing stages for producing a multi-valve device shown in section in FIG. 1g, FIGS. 2a to 2d: show an alternative exemplary embodiment comprising a multi-valve arrangement embodied according to the concept of the invention, in different, partially sectional views, and FIGS. 3a to 3d: show an exemplary embodiment of multi-valve arrangements according to FIGS. 1a to 1g in different, partially sectional views.

The same elements and elements with the same function are identified with the same reference numerals in the Figures.

DETAILED DESCRIPTION

Figure 2A:
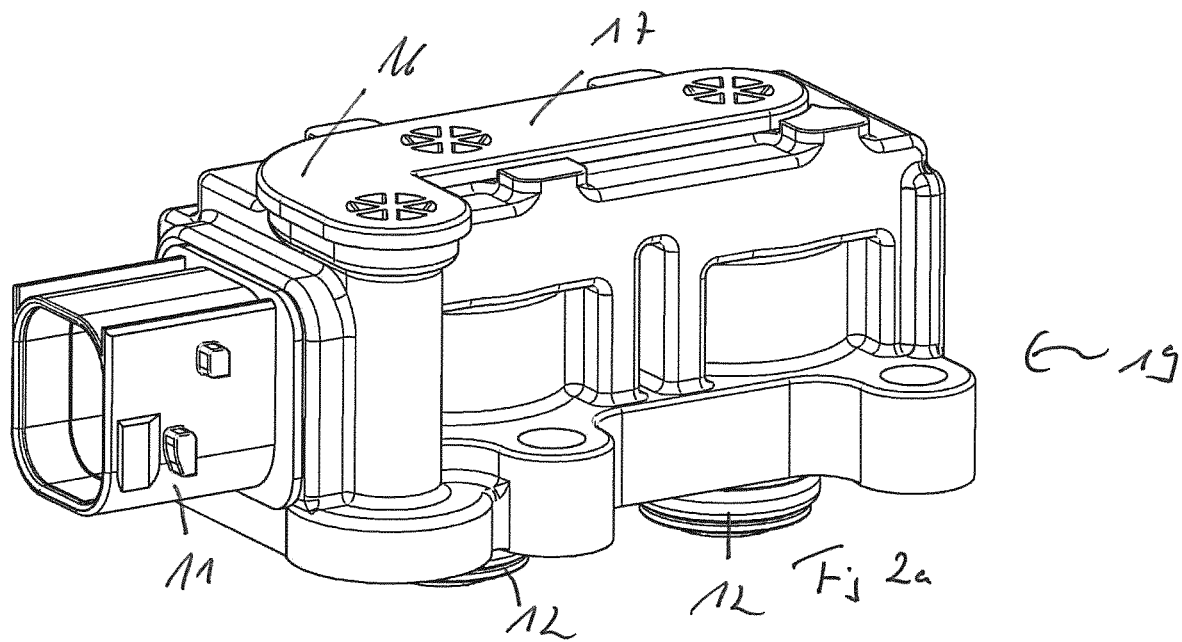
Figure 2B:
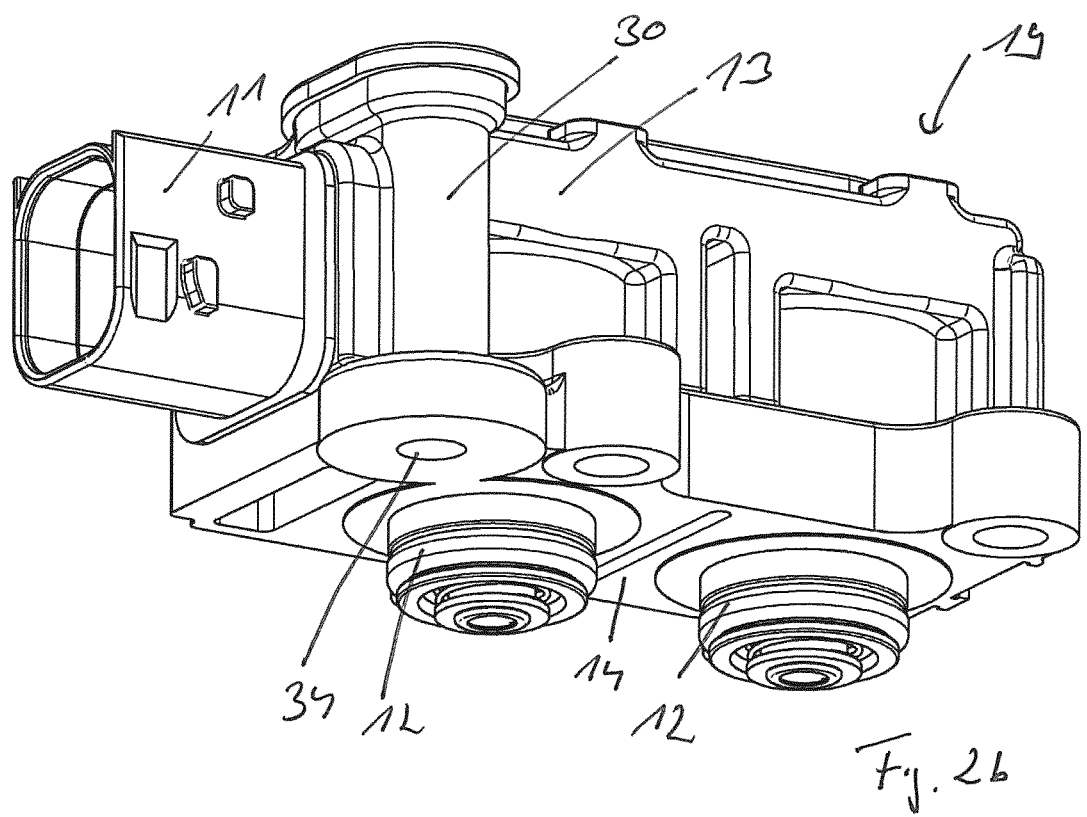
Figure 2C:
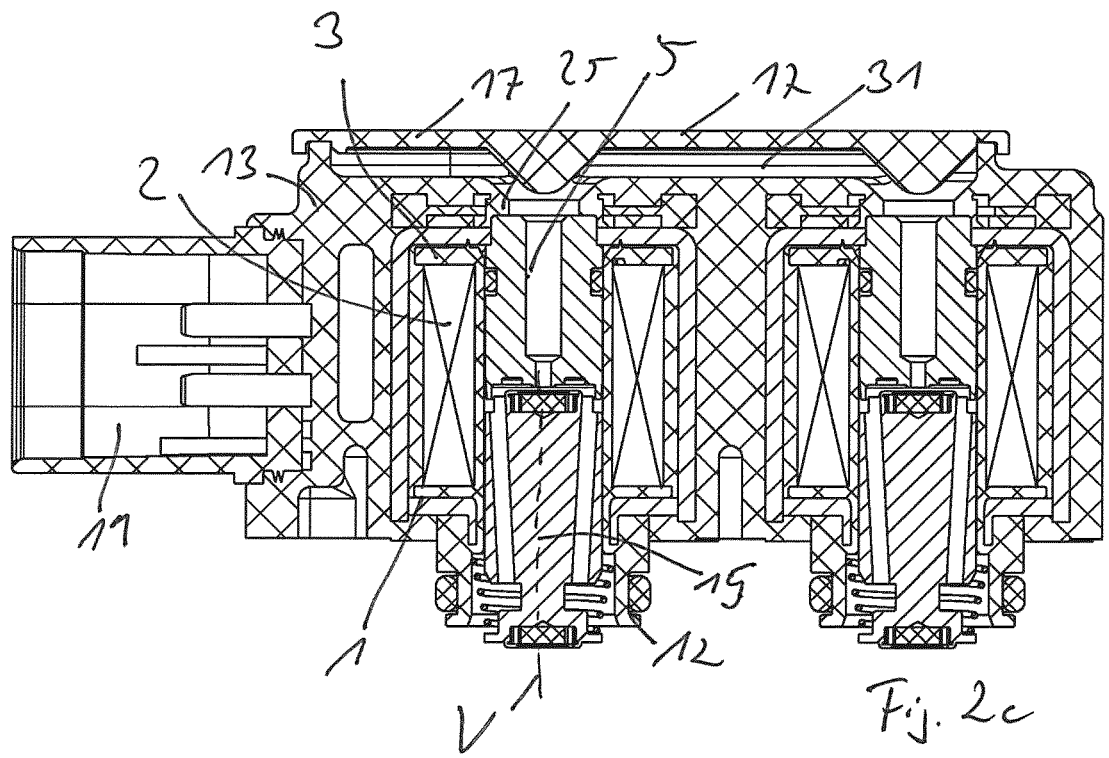
Figure 2D:
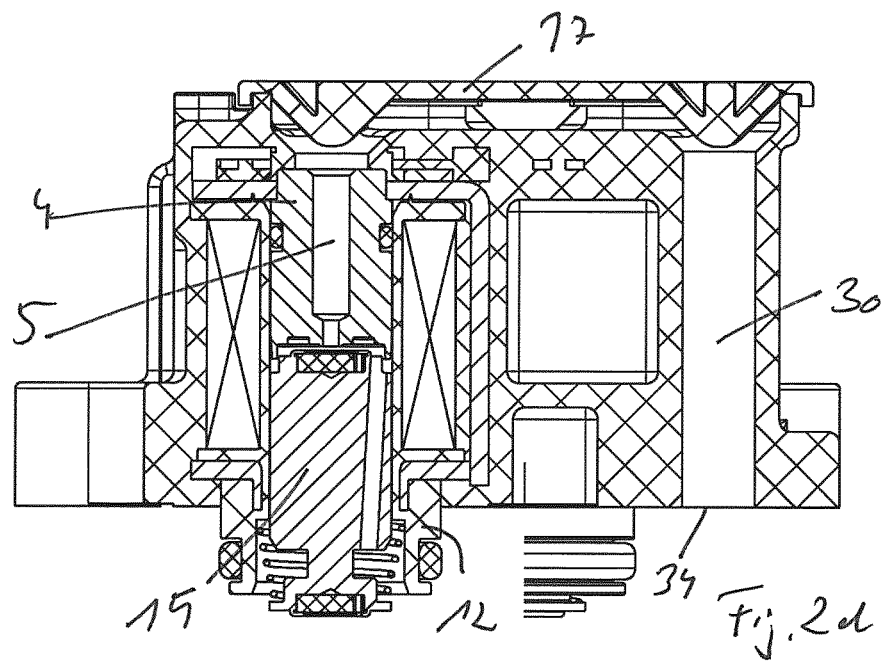

FIGS. 1a to 1e show different assembly steps and components for producing a valve device according to the invention, which is illustrated in FIG. 1f in a perspective view and which, in turn, is illustrated in a sectional view in FIG. 1g.

FIG. 1a shows a preassembled, electromagnetic valve actuator 1, of which a plurality—here for example three pieces—is provided in the finished multi-valve device (valve block) illustrated in FIGS. 1f and 1g. The electromagnetic valve actuator 1 comprises an energizable coil element 2 (electrical winding), which is arranged on a coil carrier 3, which is embodied as plastic injection molded part. A core 4 for the electromagnetic interaction with non-illustrated armature elements is located in a central passage opening (central bore) of the coil carrier 3. A central venting bore 5 is provided in the core 4. The coil elements 3 are clasped by a magnetically conducting yoke 6 for surrounding the magnetic circuit. Electrical contact elements 7 for energizing or electrically contacting, respectively, the coil elements 2 can be seen.

A pneumatic connection 12 for pneumatically contacting the valve actuator 1 is shown in FIG. 1a on the bottom in the drawing plane.

A plurality of such valve actuators 1, here for example three, is provided in the context of the production method. A connection plate 8 for electrically contacting the contacts 7 of a plurality of valve actuators 1 is shown in FIG. 1b. The connection plate 8 consists of conducting areas 9 as well as flanging sections 10 for fixing a plurality of, here three, valve actuators 1. The connection plate 8 comprises electrical connection elements 11, here in the form of a contact bushing.

FIG. 1c shows the next assembly or production step, respectively. It can be seen that the plurality of valve actuators 1 is arranged on the connection plate 8, which extends perpendicular to the displacement axes V of the armature elements 15 (see FIG. 1g), which will be explained later.

The arrangement of connection plate 8 with connection contact 10 and the valve actuators 1 is overmolded in a next manufacturing step and a monolithic housing base body 13 is created thereby, from the connection housing side 14 of which, which is shown on the bottom in FIG. 1g, the pneumatic connections of the valve actuators 1 protrude. A housing back side 16 of the housing 18 of the multi-valve device 19, which is formed from the housing base body 13 and a housing cover 17 fixed thereto by means of welding, is located at a distance from the connection housing side 14 along the displacement axes V of the armature elements 15.

It can be seen in FIG. 1d that a trough 20, which is formed into the monolithic housing base body 13 by corresponding embodiment of the injection molding tool, is provided on the side of the housing base body 13, which faces away from the connection housing side 14 and which partially forms the housing back side 16. A trough opening 21 is bounded by a circumferential trough edge 22, which, in turn, is embodied on a circumferential, circumferentially closed ring collar 23, which is monolithically embodied with the housing base body 13 and which protrudes in the area of the housing back side 16. This ring collar 23 forms a ring-shaped front face 24 for attaching the housing cover shown in FIG. 1e.

Connection channels 25, which, as follows from FIG. 1g, are connected to the venting bores 5 of the cores 4 for air conduction and which are axially aligned therewith along the respective displacement axis V, lead into the trough 20. The connection channels 25 are embodied by corresponding sections of the monolithic housing base body 13. It can be seen from FIG. 1g that the connection channels 25 have openings 26 on the outlet side in the area of a trough base 27, which is recessed, as are the openings 26 with respect to the front face 24 or the trough opening edge 22, respectively, in the direction of the connection housing side 14, so that the venting bores 5 or the connection channels 25, which are each axially aligned therewith, are connected to each other via the trough 20 itself and a corresponding curvature does not need to be provided in the housing cover 17.

As mentioned, the housing cover 17 is shown alone in FIG. 1e, namely from an underside, which faces the housing base body 13. A circumferential ring groove 28 on the edge side or underside, respectively, for attaching to the circumferential ring collar 23 of the housing base body 13 can be seen.

A plurality of curvatures 29, which is associated with the connection channels as well as to the venting channel 30, which will be explained below, and which connects the venting collection channel 31, which is bounded by the housing cover 17 and the trough 20, to a venting opening of the housing 18 on the connection housing side, can also be seen in FIG. 1e. Reinforcing struts or ribs 32, respectively, which are embodied monolithically with the housing cover 17, are located on the back side of the curvatures 29. It can be seen that the housing cover 17 is embodied so as to be plane in the area of the housing back side 16, and does not have any curvatures, which face away from the connection housing side.

As can in particular be seen from FIG. 1g, all functional units of the multi-valve arrangement 19 are arranged or held, respectively, in the housing base body 13, in particular by means of partial or complete overmolding. A distributor plate 42, into which the pneumatic connections 12 protrude, is fixed to the connection housing side 14. The (working) valve seats 43, with which elastomeric sealing elements 33 interact, which are held on the armature elements 15, so as to open and to close a connection between a compressed air (supply) line and a working line, are also arranged in this distributor plate 42.

The detailed setup of the multi-valve device 19 according to FIGS. 1f and 1g will be described below by means of FIGS. 3a to 3d, wherein, to avoid repetitions, reference is also made to the preceding Figure description, which applies in this regard.

Figure 3A:
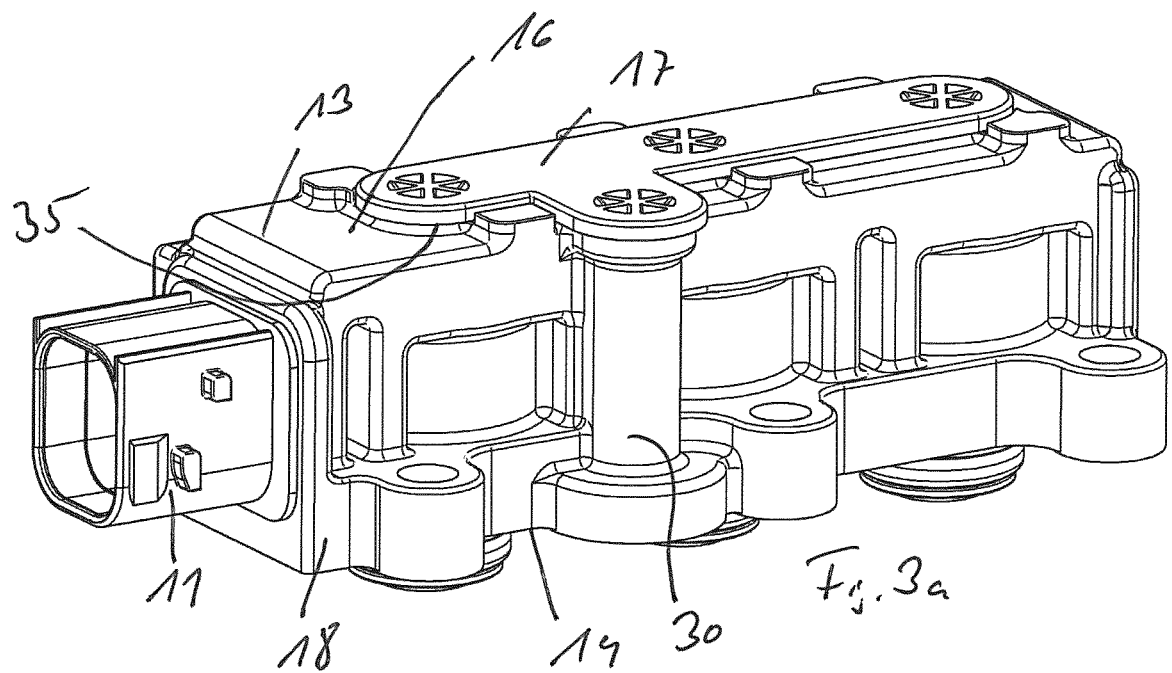
Figure 3B:
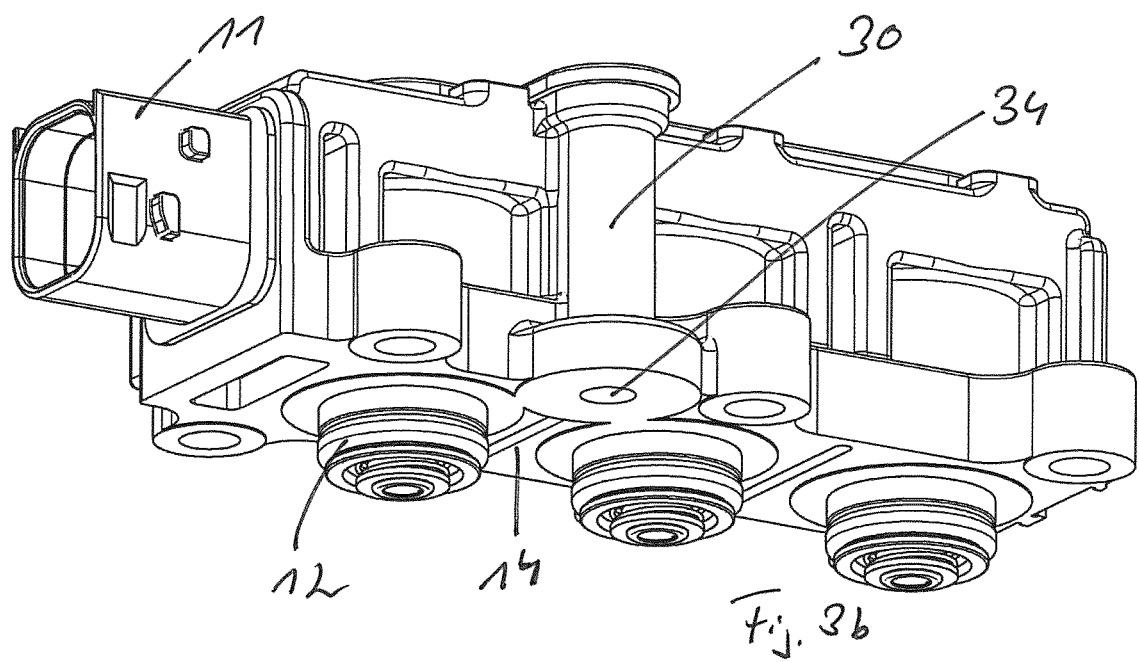

The multi-valve device 19, which is embodied as three-way valve arrangement here, is shown in FIGS. 3a and 3b in different perspective views.

The monolithic housing body 13 can be seen, which, together with the housing cover 17, forms the housing 18, which partially has the housing back side 16 and, located opposite thereto or facing away therefrom, respectively, the connection housing side 14 with its pneumatic connections 12. The venting channel 30, which is produced by means of the mentioned overmolding process and which extends parallel to the displacement axes of the armature elements 15 and which leads to a venting opening 34 on the connection housing side 14, can also be seen.

The housing cover 17, which is flat or plane on the back side, respectively, and which closes the housing base body-side trough 20 in an air-tight manner, can be seen well in FIG. 3a. An air-tight, circumferential welding connection, i.e. an integral connection, is embodied between the housing cover 17 and the housing base body 13.

The inner setup of the multi-valve arrangement 19 becomes clear from FIGS. 3c and 3d. The plurality of valve actuators 1, which are arranged next to each other, can be seen, each comprising armature elements 15, which can be displaced axially along a respective displacement axis V and which interact with each other via a preferably elastomeric sealing element 33, which is on the bottom in the drawing plane and is held on the armature element 15, in the area of the respective pneumatic connection 12 with a respective, (operating) valve seat 43, which is not shown, (see FIG. 1g) in the distributor plate 42, which is also not shown (see FIG. 1g) in an area outside of the housing 18 as well as outside of the respective supply connection 12.

On the opposite side along the displacement axis V or facing away from the sealing element 33, respectively, the armature elements 15 each support a further elastomeric sealing element 36 for interacting with a respective venting valve seat 37 on the core 4. By attaching the upper sealing element 36 in the drawing plane to the venting valve seat 37, the corresponding venting bore 5 can be closed in the core 4. In the case of the armature elements 15, which are displaced away from the venting valve seat 37, a working area 38 formed axially between the armature elements 15 and the core 4 is connected to the venting collection channel 31 via the venting bore 5 as well as the adjacent connection channel 25 for air conduction, which venting collection channel 31, in turn, is formed by the trough 20 in the housing base body 13, together with the housing cover 17.

Connection lines 39, which extend along the respective displacement axis V and which are embodied at a slight incline here in an exemplary manner, are embodied in armature elements 15 as passage openings or bores, respectively, which connect the respective pneumatic connection 12, more precisely a non-illustrated working line, which is provided at that location, of the valve plate, which is also not shown, to the working area 38 for air conduction.

A return spring 40, against the spring force of which the armature elements 15 can be displaced in response to energization, i.e. upwards in the drawing plane here, pushes the armature elements 15 downwards in the drawing plane against the non-illustrated lower valve seat in the valve plate, which serves to close a compressed air line (supply line), which is only suggested once via an arrow 41. If the coil elements 2 are not energized, the return spring 40 pushes the armature elements 15 against the lower valve seat, so that the air-conducting connection between the supply line and the working line is interrupted. The working line is simultaneously vented via the connection lines 39, the working area 38 (working chamber), the venting bore 5 as well as the adjacent connection channel 25, namely into the venting collection channel 31 and via the latter or the venting channel 30, which leads out of said venting collection channel, to the venting opening 34. In response to energizing the coil elements 2, the armature elements 15 are displaced away from the lower valve seat against the venting valve seat 37, whereby the venting is interrupted or the venting bore 5 is closed, respectively.

It can be seen from an overall view of FIGS. 3c and 3d that the monolithic housing base body 13 encloses the valve actuators 1 and in particular also protrudes into areas between the valve actuators 1. The venting channel 30 embodied in the housing base body 13, which is connected to the venting collection channel 31, leads into the connection housing-side venting opening 34.

The multi-valve arrangement 19 according to FIGS. 2a to 2d has basically functionally the same setup, wherein only exclusively two valve actuators 1 are arranged next to each other here instead of three valve actuators 1. To avoid repetitions, reference is made to the preceding Figure description with regard to the predominant commonalities.

REFERENCE NUMERALS 1 valve actuator
2 coil element
3 coil carrier
4 core
5 venting bore
6 yoke
7 contact elements
8 connection plate
9 conducting areas
10 flanging sections
11 connection elements
12 pneumatic connection
13 housing base body
14 connection housing side
15 armature elements
16 housing back side
17 housing cover
18 housing
19 multi-valve device
20 trough
21 trough opening
22 trough edge
23 ring collar
24 front face
25 connection channels
26 openings
27 trough base
28 ring nut
29 curvatures
30 venting channel
31 venting collection channel
32 reinforcing ribs
33 (elastomeric) sealing elements
34 venting opening
35 welded connection
36 (elastomeric) sealing elements
37 venting valve seats
38 working areas (working chamber)
39 connection lines
40 return spring
41 arrow
42 distributor plate
43 (working) valve seat
V displacement axis

The invention claimed is:

1. A pneumatic multi-valve device, comprising a housing (18), which has a housing main body (13) with a plurality of electromagnetic valve actuators (1), each having coil elements (2) arranged in the housing (18) in a stationary manner, a core (4) arranged in the housing (18), and armature elements (15), which can be displaced along a displacement axis (V) in the housing (18) in relation to the core (4) and in relation to a pneumatic connection (12) of the housing (18) in response to energizing of the coil elements (2), wherein the displacement axes (V) of the armature elements (15) of the valve actuators (1) are oriented parallel and the pneumatic connections (12) associated with the armature elements (15) are arranged adjacent to each other on a connection housing side (14), which is spaced apart from a housing back side (16) facing away therefrom along the displacement axes (V), wherein the cores (4) each have a venting bore (5), which is connected, for air conduction, to a venting collection channel (31) on the side of the cores (4) facing away from the connection housing side (14), which venting collection channel is bounded on the housing back side (16) by a housing cover (17) fastened to the housing main body (13), which venting collection channel is connected, for air conduction, to a venting opening of the housing (18), which venting opening is arranged on a housing side different from the housing back side (16), in particular on the connection housing side (14) having the pneumatic connections (12), wherein the housing cover (17) is fixed to the housing base body (13) via an air-tight welded connection (35), in particular an ultrasonic or laser welded connection, and wherein the venting collection channel (31) has a trough (20), which is formed in the housing base body (13), the trough opening (21) of which, which faces in the direction of the housing back side (16), is closed by the housing cover (17) and wherein connection channels (25), which are formed by the housing base body (13) and which are connected to the venting bores (5) for air conduction, each lead into the trough (20) on a trough base (27), in each case offset at a distance from the trough edge (22) in the direction of the connection housing side (14), and a venting channel (30), which is embodied in the housing body and connects the venting collection channel (31) to the venting opening (34) and opens out offset from the trough edge (22) at a distance in the direction of the connection housing side (14).

2. The multi-valve device according to claim 1, wherein the trough opening (21) is bounded by a circumferential ring collar (23), which forms the trough edge (22) and which is embodied monolithically with the housing base body (13) and on which the housing cover (17) sits on the front side.

3. The multi-valve device according to claim 2, wherein the housing cover (17) is welded to the ring collar (23).

4. The multi-valve device according to claim 1, wherein the housing cover (17) engages across the ring collar (23) on the outer circumferential side thereof and/or on the inner circumferential side thereof in the direction of the connection housing side (14).

5. The multi-valve device according to claim 1, wherein the housing cover (17) has protuberances, which protrude in the direction of the venting channels (30), into the connection channels (25), and which comprise reinforcing ribs (32) on the back side (16) of the housing cover (17).

6. The multi-valve device according to claim 1, wherein the housing base body (13) is embodied as monolithic plastic injection molded body, which is produced by overmolding the coil elements (2).

7. The multi-valve device according to claim 1, wherein the connection channels (25) permeate a joint electrical connection plate (8) for electrically contacting the plurality of coil elements (2), axially in extension of the displacement axes (V), which is overmolded by the housing base body (13).

8. The multi-valve device according to claim 1, wherein, by partial overmolding with the housing base body (13), the pneumatic connections (12) are fixed in said housing base body.

9. The multi-valve device according to claim 1, wherein the armature elements (15) are in each case guided directly in a coil carrier (3), which is embodied as plastic injection molded part, of the associated coil elements (2) in a longitudinally displaceable manner, without interpositioning an armature guide tube.

10. The multi-valve device according to claim 1, wherein the venting bores (5), which are centrically arranged in the cores (4), run axially in a straight line and are parallel among each other and/or wherein a respective working chamber, which can be vented via the corresponding venting bore, is bounded by each armature element and the associated core (4).

11. The multi-valve device according claim 1, wherein the venting bores (5) are connected to the pneumatic connection (12) and/or a working line via a respective connection line (39), which in particular leads into the respective working chamber (38).

12. The multi-valve device according to claim 1, wherein a venting valve seat (37), which is associated with the corresponding venting bore (5), is in each case associated with the armature elements (15) for closing the respective venting bore (5) by energizing the coil elements (2).

13. The multi-valve device according to claim 1, wherein a working valve seat (43) in each case is associated with the armature elements (15) in the area of the pneumatic connection (12) for opening and closing a connection for air conduction between a pressure supply line and a working line.

14. The multi-valve device according to claim 1, wherein the housing (18) is connected via the pneumatic connections (12) to a distributor plate (42) having working valve seats (43) for interacting with the armature elements (15), at least one pressure supply line and at least one working line.

15. The multi-valve device according to claim 1, wherein the venting channel (30) extends parallel to the displacement axes (V).

16. The multi-valve device according to claim 11, wherein the respective connection line (39) comprises at least one bore in the respective armature elements (15) and/or is embodied on the outer circumference of the armature elements (15).

17. A method for producing a multi-valve device according to claim 1, wherein a plurality of coil elements (2) each comprising a core (4) arranged therein and having a venting bore (5) is provided, and a housing base body (13) is produced, in particular by means of overmolding the coil elements (2), to which a housing cover (17) for bounding a venting collection channel (31) is fixed, wherein the housing cover (17) is welded to the housing base body (13) by establishing an air-tight welded connection, in particular an ultrasonic or laser welded connection.

18. The method of claim 17, wherein the housing base body (13) is monolithic and wherein the connection is established without inter positioning an elastomeric seal.

\* \* \* \* \*